United States Patent [19]

Graham et al.

[11] 4,294,786

[45] Oct. 13, 1981

[54] SOLAR HEAT ENERGY COLLECTING SYSTEMS AND METHODS OF MAKING THE SAME

[75] Inventors: Alan A. Graham, Mercerville, N.J.; Laurence F. Haemer, Newton, Pa.; Charles H. Miller, Lawrenceville, N.J.

[73] Assignee: Congoleum Corporation, Kearny, N.J.

[21] Appl. No.: 26,274

[22] Filed: Apr. 2, 1979

[51] Int. Cl.[3] ............................................. B29D 27/00
[52] U.S. Cl. .................................. 264/46.4; 126/432; 126/448; 156/79; 156/277; 156/289; 156/315; 264/52; 264/512; 264/338; 264/DIG. 82
[58] Field of Search ................... 264/46.4, 46.6, 46.7, 264/338, 52, DIG. 82, 512; 126/432, 448; 156/79, 277, 289, 315

[56] References Cited

U.S. PATENT DOCUMENTS

| | | | |
|---|---|---|---|
| 3,161,436 | 12/1964 | Hood | 264/46.7 X |
| 3,293,094 | 12/1966 | Nairn et al. | 264/52 X |
| 3,293,108 | 12/1966 | Nairn et al. | 264/46.6 X |
| 3,428,471 | 2/1969 | Tuthill et al. | 264/46.4 X |
| 3,798,098 | 3/1974 | Ogawa et al. | 264/52 |
| 4,030,478 | 6/1977 | Beaver | 126/448 |
| 4,187,131 | 2/1980 | Shortway et al. | 264/52 X |
| 4,194,491 | 3/1980 | Randall | 126/448 X |
| 4,214,028 | 7/1980 | Shortway et al. | 264/52 X |

FOREIGN PATENT DOCUMENTS

| | | | |
|---|---|---|---|
| 2735070 | 2/1978 | Fed. Rep. of Germany | 126/432 |
| 2298067 | 9/1976 | France | 126/432 |
| 2406165 | 10/1977 | France | 126/448 |

*Primary Examiner*—Philip Anderson
*Attorney, Agent, or Firm*—Richard T. Laughlin

[57] ABSTRACT

A method of making a solar heat energy collecting system which comprises: forming a potentially foamable, resinous base layer containing a blowing agent; applying a printing composition to the surface of the potentially foamable, resinous base layer in the form of at least one continuous path extending from one edge point to another edge point of the potentially foamable, resinous base layer, the printing composition comprising a blowing inhibitor and a release agent; applying a top surface layer to the surface of the printed potentially foamable, resinous base layer which adheres thereto except in those areas containing the blowing inhibitor and release agent; heating the potentially foamable, resinous base layer to decompose or to activate the blowing agent in those portions of the potentially foamable, resinous base layer not lying under the blowing inhibitor and release agent, whereby such portions are blown and expand to extend and stretch upwardly so as to form upright walls of foamed, relatively lower density resinous material extending substantially vertically from the main portion of the resinous base layer, while those other portions of the potentially foamable, resinous base layer lying under the blowing inhibitor and release agent remain relatively unaffected; and supplying a fluid medium to those printed areas of the potentially foamable, resinous base layer lying over the blowing inhibitor and release agent, whereby the top surface layer is moved upwardly to form at least one continuous open channel extending from one edge point of the resinous base layer to another edge point of the resinous base layer and capable of conducting a heat transfer fluid medium therethrough. The inventive concept also relates to the solar heat energy collecting systems resulting from such methods.

8 Claims, 8 Drawing Figures

SOLAR HEAT ENERGY COLLECTING SYSTEMS AND METHODS OF MAKING THE SAME

FIELD OF THE INVENTION

The present invention relates to method of making solar heat energy collecting systems. More specifically, the present invention relates to solar heat energy collecting systems which are made essentially from all synthetic resinous materials and are light in weight, low in cost, flexible and portable, durable, and easy and inexpensive to install, maintain and to remove, when so desired or required.

BACKGROUND OF THE INVENTION

In recent years, the cost of heating oils has increased manyfold, leading to related increases in the costs of other heating fuels, such as coal, gas, wood, peat, etc., as well as substantial increases in the cost of electrical energy whereby a much greater interest in other sources of energy has been evidenced.

The collection and use of solar heat energy has been in the foreground of such greater interest. However, there have been many drawbacks and difficulties encountered in the search for improved collection systems for solar heat energy. The initial cost of installation and the difficulty of installation of many solar heat energy collecting systems has prevented their more widespread acceptance. The heaviness in weight and the relative inflexibility of use of other systems has also contributed to a lack of more general approval. The use of glass, with its breakage considerations and lack of durability, has but added to the many problems of present day systems.

PURPOSES AND OBJECTS OF THE INVENTION

The principal purposes and objects of the present invention are therefor to provide for methods of making improved solar heat energy collecting systems which are light in weight, are low in cost, and particularly inexpensive insofar as the initial installation is concerned, are flexible and portable, are durable and are easy to install, or to maintain, or to remove, if so required or desired.

BRIEF SUMMARY OF THE INVENTION

It has been found that such principal purposes and objects, as well as other principal purposes and objects which will become clear from a further reading and understanding of this disclosure, may be achieved by: forming a substantially flat, potentially foamable, resinous base layer containing a blowing agent; applying a printing composition to the surface of the potentially foamable, resinous base layer in the form of at least one continuous path extending from one edge point to another edge point of the potentially foamable, resinous base layer, the printing composition containing a blowing inhibitor and a release agent; applying a relatively thin, top surface layer to the printed surface of the potentially foamable, resinous base layer which adheres thereto except in those areas containing the blowing inhibitor and release agent; heating the potentially foamable, resinous base layer to decompose or activate the blowing agent in those portions of the potentially foamable, resinous base layer not lying under the blowing inhibitor and release agent, whereby such portions are blown and expand to extend and stretch upwardly so as to be capable of forming upright walls of foamed, relatively lower density resinous material extending substantially vertically upwardly from the main portion of the resinous base layer, while those other portions of the potentially foamable, resinous base layer lying under the blowing inhibitor and release agent remain relatively unaffected; and supplying a fluid medium to those areas of the potentially foamable, resinous base layer lying above the blowing inhibitor and release agent, whereby the top surface layer is moved upwardly to form at least one continuous open channel extending from one edge point to another edge point of the resinous base layer and capable of conducting a heat transfer fluid medium therethrough.

Then, when the heat transfer fluid medium is delivered to the solar heat energy collecting system through a suitable inlet, it is conducted, preferably but not necessarily, in a circuitous, serpentine fashion from that edge point to another edge point on the resinous base layer to absorb and collect solar heat energy while it is being so conducted and then, subsequently, to be removed by a suitable outlet to be conducted to the material or system to be heated by the solar heat energy.

BRIEF DESCRIPTION OF THE DRAWINGS

In the following specification and accompanying self-explanatory drawings, there are described and illustrated preferred and typical embodiments of the present invention but it is to be appreciated that the present invention is not to be construed as limited to such preferred and typical embodiments as are specifically disclosed and illustrated but to include other similar and equivalent embodiments as are determined by the scope and the spirit of the appended claims. Also, it is to be appreciated that the Figures of the drawings have not been drawn precisely or accurately to scale. Some portions and some dimensions therein have been drawn to a slightly larger scale, whereas certain other portions and dimensions therein have been drawn to a slightly smaller scale.

Such variations have been done merely to bring out more clearly some of the finer details of the smaller portions and to accentuate some of the more important features and aspects of the present invention, such as, for example, the thickness of the printing composition layer which has been drawn increased manyfold in the Figures.

Figure 1:
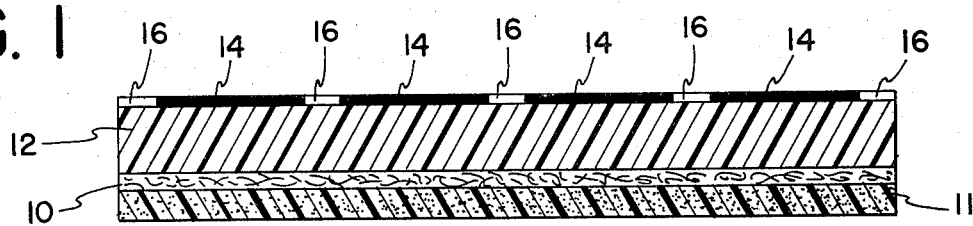

Referring to the drawings,

FIG. 1 is a fragmentary, diagrammatic, elevational, cross-sectional view of one embodiment of the present invention, showing the potentially foamable, resinous base layer containing a blowing agent, prior to the blowing and foaming operation.

Figure 2:
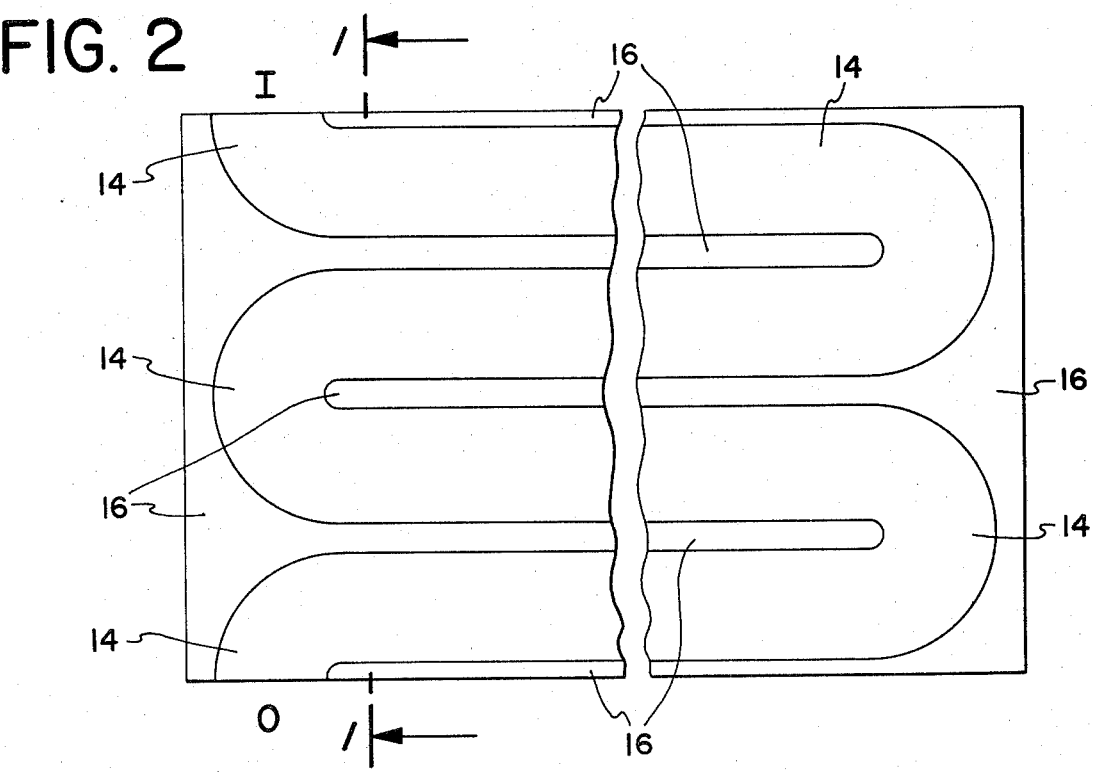

FIG. 2 is a fragmentary, diagrammatic, plan view of the potentially foamable, resinous base layer of FIG. 1, showing one preferred and typical example of the printing pattern which is applied to the surface thereof. Line 1—1 is included in FIG. 2 to indicate the location at which the cross-sectional view of FIG. 1 is taken.

Figure 3:
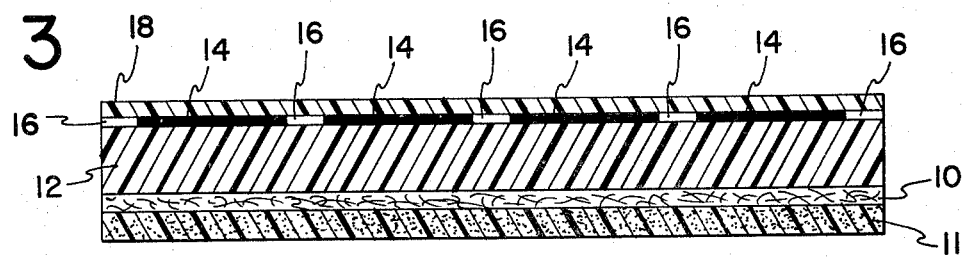

FIG. 3 is a fragmentary, diagrammatic, elevational, cross-sectional view of the embodiment of FIG. 1, taken after the relatively thin, top surface layer has been applied to the printed, potentially foamable, resinous base layer.

Figure 4:
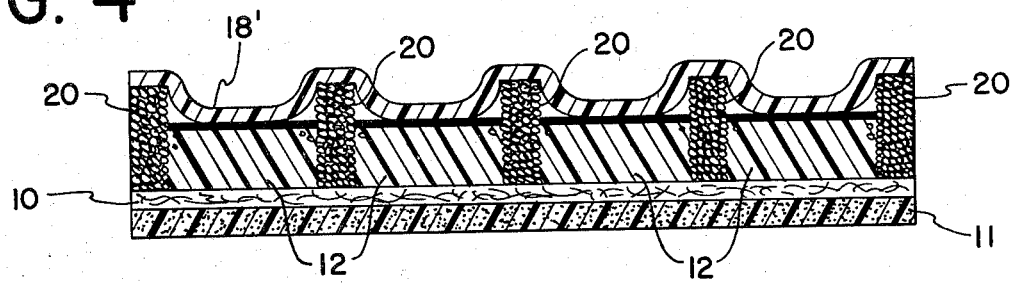

FIG. 4 is a fragmentary, diagrammatic, elevational, cross-sectional view of the embodiment of FIG. 1, taken after the blowing and foaming operation at a relatively low blow ratio.

Figure 4A:
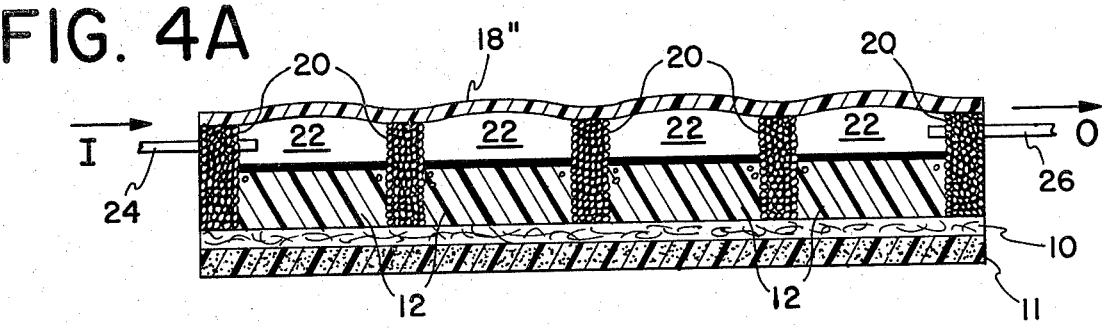

FIG. 4A is a fragmentary, diagrammatic, elevational, cross-sectional view of the embodiment of FIG. 1, taken after fluid has been pumped under pressure through the solar heat energy collecting system to form an enlarged open space or continuous channel therein.

Figure 5:
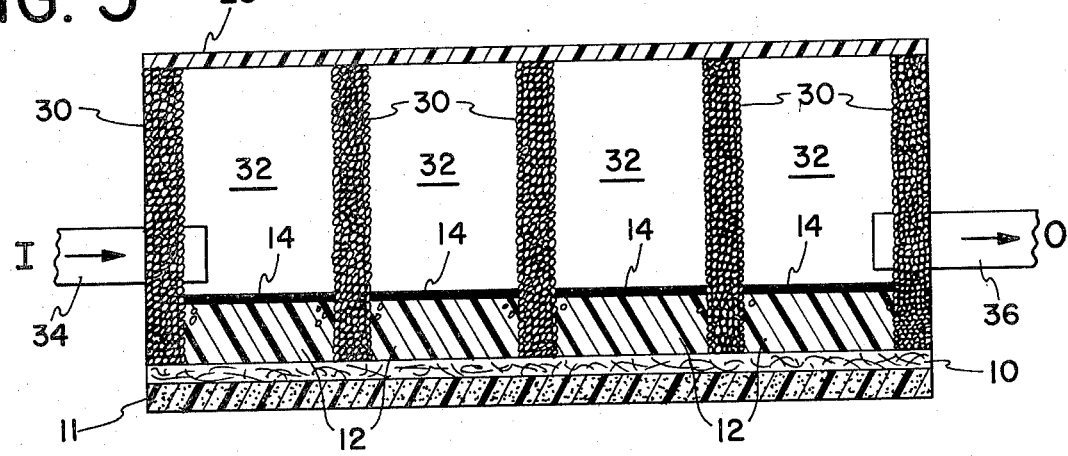

FIG. 5 is a fragmentary, diagrammatic, elevational, cross-sectional view of the embodiment of FIG. 1, taken after the blowing and foaming operation at a much higher blow ratio, and after an inlet conduit and an outlet conduit have been added to the solar heat energy collecting system.

Figure 6:
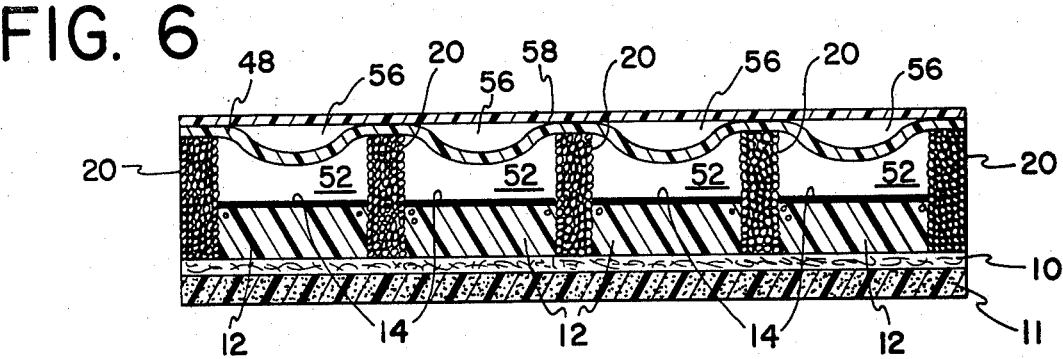

FIG. 6 is a fragmentary, diagrammatic, elevational, cross-sectional view of another preferred and typical embodiment of the present invention.

Figure 7:
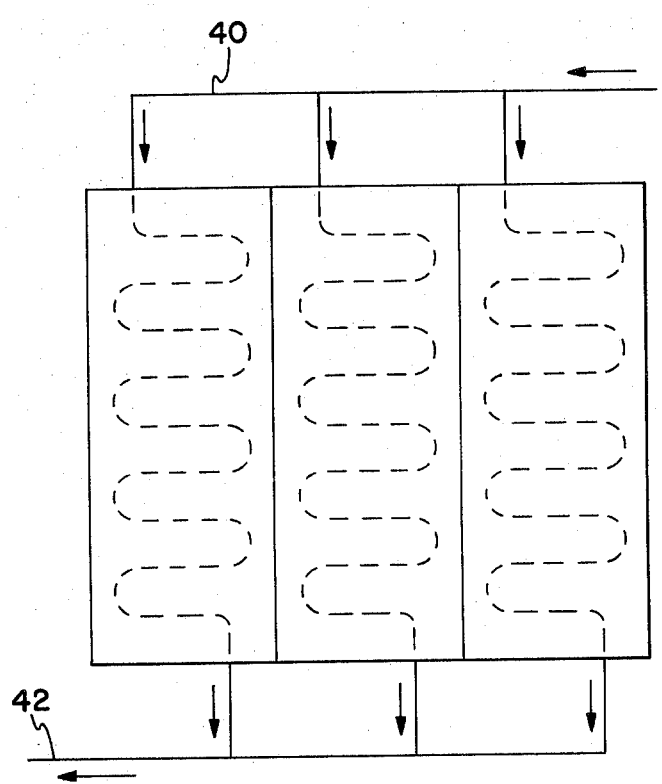

FIG. 7 is a schematic, diagrammatic plan view, showing the use of a plurality of solar heat energy collecting systems which employ a plurality of continuous serpentine paths therein for conducting heat transfer fluid medium through the solar heat energy collecting system.

GENERAL DESCRIPTION OF THE INVENTION

The Preferred and Typical Embodiment

In FIG. 1, there is illustrated a supporting substrate 10 upon which is placed or formed a potentially foamable, resinous base layer 12 to the surface of which has been applied a printing composition 14 containing a blowing inhibitor and a release agent. If desired, a printing composition 16 which does not contain any blowing or foaming agents or release agents may be applied to those areas not covered by the printing composition 14. The printing composition 14 containing the blowing inhibitor and release agent is required for the operation of the present invention. The printing composition 16 which does not contain any blowing or foaming inhibitor or release agent is not required and may be omitted, if so desired.

THE SUPPORTING SUBSTRATE

A relatively thin, backing web or sheet material may be used as the supporting substrate 10 for the potentially foamable, resinous base layer 12. Such a supporting substrate 10 may comprise a felted or matted fibrous sheet of overlapping, intertwined fibers and/or filaments; or a non-woven, knitted, woven or otherwise fabricated textile product; or a sheet of resinous polymer composition; or paper or a paper-product; a film; or other similar and like equivalent constructions and materials. A felted fibrous material comprising inorganic fibers, such as asbestos, or organic fibers, such as cotton, jute, rayon, etc.; or synthetic or man-made fibers and/or filaments, such as polyolefins, polyamides, acrylics, glass, etc.; is the most commonly used backing sheet material or supporting substrate 10, but many other types and forms are equally suitable and utilizable in certain circumstances.

The thickness of such a relatively flat, supporting substrate 10 will depend to a large extent upon the particular subsequent environment and use for which the product is intended. Such thicknesses, normally, are in the range of from about 10 mils to about 100 mils, but other thicknesses, especially those which are greater than 100 mils, may be employed in special or particular circumstances. In some circumstances, the supporting substrate 10 may be omitted, especially where the remaining construction is self-supporting.

If desired, a relatively flat, supporting substrate 11, such as a polyurethane or polystyrene foamed material or other aerated, light weight, multicellular foamed or expanded plastic material or similar or like material having good heat insulating properties and a thickness of up to about a quarter inch or even more may be used in addition to, or to replace, the supporting substrate 10.

THE POTENTIALLY FOAMABLE, RESINOUS BASE LAYER

The potentially foamable, resinous base layer 12 contains essentially the same constituents and in the same general proportions as the potentially foamable, resinous base layers to be found in such prior art U.S. Pat. Nos. 3,293,094 and 3,293,108 which issued to R. F. Nairn et al. on Dec. 20, 1966.

The potentially foamable, resinous baselayer 12 which is applied to or formed on the supporting substrate 10 is preferably a dispersion or a suspension of a synthetic resin in a liquid or semi-liquid medium. The dispersing or suspending medium may be one or more plasticizers in the case of a plastisol, or it may be water in the case of an aqueous latex or an aquasol, or it may be one or more organic solvents in the case of an organosol. Plastisols are preferred.

The present invention will be described in greater detail with specific reference to plastisols of polyvinyl chloride as the synthetic resin, either as a homopolymer or a co-polymer. However, many other synthetic resins are of use, such as polyolefins, such as polyethylene and polypropylene, the methacrylates and acrylates, polyamides, polystyrenes, polyurethanes, elastomers such as synthetic rubber, neoprene, ethylene-propylene copolymers, chlorsulphonated polyethylene, etc.

Various plasticizers, such as dibutyl sebacate, butyl benzyl phthalate, di(2-ethylhexyl)phthalate, dioctyl phthalate, etc., may be included in the formulation of the potentially foamable, resinous base layer 12, along with blowing or foaming agents, as azodicarbonamide, various accelerator/stabilizers or catalysts, such as dibasic lead phthalate, zinc octoate, zinc oxide, lead octoate, dibasic lead phosphite, etc., various light and heat stabilizers, such as metallic soaps and organo tin compounds; coloring agents and pigments, such as carbon black, titanium dioxide; organic solvents such as methyl ethyl ketone, methyl isobutyl ketone, mineral spirits, etc.; fillers such as clay and limestone; and many other conventional and well-known additives and improvement agents. Anti-oxidants, such as hindered phenols and sulfides, substituted benzophenones, salicylates, benzotriazoles, carbon black, nickel organic complexes, barium-cadmium, barium-zinc, with various anions, etc., are of use.

The thickness of the potentially foamable, resinous base layer 12, as applied to the supporting substrate 10 and still soft and wet, is in the range of from about 0.010 inch to about 0.200 inch, depending upon the future intended use of finished material. Greater or lesser thicknesses may be used, as desired.

After the potentially foamable, resinous base layer 12 has been applied to the supporting substrate 10, it is then heated in an oven or other suitable heating apparatus maintained at an elevated temperature of from about 240° F. to about 430° F., and preferably from about 280° F. to about 340° F. for a period of time of from about 1 minute to about 4 minutes, whereupon it gels and becomes firm and semi-solid. The temperature and the time are mutually interdependent and the higher the temperature, the shorter is the top of exposure to the elevated temperatures, and vice versa. The elevated temperatures, however, are not that high as to decompose or to activate the blowing or foaming agent in the potentially foamable, resinous base layer 12 as to cause blowing or foaming at this time.

THE PRINTING COMPOSITION

The printing composition 14 which is applied to the gelled surface of the potentially foamable, resinous base layer 12 contains (except for one added constituent) essentially the same constituents and generally the same proportions as those to be found in the printing ink compositions of the previously-cited U.S. Patents.

These printing compositions normally include: resinous materials such as polyvinyl chloride homopolymers and copolymers, such as vinyl chloride-vinyl acetate copolymers, organic solvents, such as methyl ethyl ketone, methyl isobutyl ketone, etc., pigments and colorants such as carbon black and titanium dioxide, blowing and foaming inhibitors such as fumaric acid, trimellitic anhydride, benzotriazoles, etc., and the like. However, there is one additional constituent in the printing composition 14 which is a release agent, such as polytetrafluoroethylene polymer, fluorinated ethylene propylene copolymer, and other fluorocarbon plastic materials, silicones, siloxanes, natural and manufactured waxes, talc, mica, polyamides, metallic salts of fatty acids, such as zinc stearate, soaps, polyvinyl alcohol, "Quilon" Werner type chromium complexes in isopropanol, etc. the function and use of such release agents will become clear from a further reading and understanding of this disclosure.

The amount or concentration of such release agent to be included in the printing composition 14 is in the range of from about 0.5 percent to about 5 percent by weight, based on the total weight of the printing composition 14.

In some instances, such as when there may be a question of incompatability arising with respect to the inclusion of the release agent in the printing composition 14, or when the releasing power of the release agent is desired to be more positive, the application of the printing composition 14 may be carried out in two separate steps. First, a special printing composition with the release agent removed therefrom may be applied to the potentially foamable, resinous base layer 12 in the preselected, desired pattern or design. Then, the release agent may be applied over the previously applied special printing composition in the same preselected, desired pattern or design.

The printing composition 16, if it is to be used, contains essentially the same constituents and generally the same proportions as those to be found in the printing ink compositions of the previously cited United States Patents and include: resinous materials, such as polyvinyl chloride homopolymers and copolymers, notably vinyl chloride-vinyl acetate copolymers; organic solvents, such as methyl ethyl ketone, methyl isobutyl ketone, etc.; colorants and pigments, such as titanium dioxide and carbon black. It is noted that there are no blowing or foaming inhibitors, such as fumaric acid, trimellitic anhydride or benzotriazole, etc.; nor any release agents in the printing composition 16.

If desired or required, special adhesive materials, such as vinyl chloride-vinyl acetate copolymers, may be included in the printing composition 16 to be applied therewith to the surface of the potentially foamable, resinous base layer 12 or, as described previously, two separate printing operations or steps may be employed wherein the adhesive materials are applied subsequently in the same preselected, desired pattern or design over the previously applied printing composition 16. The purpose of such adhesive materials will become clear from a further reading and understanding of this disclosure.

If included in the printing composition 16, the amount or concentration of the adhesive materials is in the range of from about 5 percent to about 15 percent by weight, based on the total weight of the printing composition 16.

The pattern or design formed by the printing compositions 14 and 16 is illustrated in FIG. 2 and the serpentine or circuitous path is to be noted but it is to be stated that other patterns and designs are possible.

THE TOP SURFACE LAYER

A relatively thin, synthetic polymeric, top surface layer 18 is then applied substantially uniformly to the printed surface of potentially foamable, resinous base layer 12, as noted in FIG. 3. Such top surface layer 18, as applied and still wet, has a substantially uniform thickness of from about 0.010 inch to about 0.100 inch. The top surface layer 18 is normally a clear, translucent or transparent resinous composition but may be black or other colors. It possesses substantially the same general formulation as the resinous base layer 12 except that, in addition to colorant considerations, it does not have any blowing or foaming agent therein and hence it is not potentially foamable. The resinous top surface layer 18 is generally similar in its constituents and in their relative proportions to the wear layers of the previously cited U.S. Patents and reference thereto is included herein.

The top surface layer 18 immediately adheres to those portions of the surface of the potentially foamable, resinous base layer 12 which are printed with the printing composition 16, particularly if it contains a special adhesive material, or to any portions which have not been printed, but does not adhere to any portions of the surface which are printed with printing compositions which contain a release agent and a relatively non-adherent surface.

After the top surface layer 18 has been applied to the resinous base layer 12, it may be gelled and firmed, if so desired or required, by being heated in an oven or other suitable heating apparatus maintained at a sufficiently elevated temperature of from about 240° F. to about 450° F. and preferably from about 280° F. to about 340° F. for a period of time of from about 1 minute to about 4 minutes whereupon it gels and firms. Such elevated temperatures, however, do not decompose or activate the blowing or foaming agent in the resinous base layer 12 and no blowing or foaming takes place at this time.

THE HEATING AND BLOWING OPERATION

The potentially foamable, resinous base layer 12 and the top surface layer 18 are then passed through an oven or other suitable heating apparatus at a sufficiently elevated temperature, higher than the gelling and foaming temperature, of from about 260° F. to about 470° F. for a period of time of from about 1 minute to about 6 minutes, whereupon the blowing and foaming agent decomposes or is activated to blow and foam those parts of the foamable, resinous base layer 12 which do not lie over the printing compositions 14 containing the blowing or foaming inhibitor. As for those portions of the resinous base layer 12 which are lying over the blowing or foaming inhibitor, such portions are relatively unaffected and are not blown or foamed and do not become distended. The action which takes place is graphically illustrated in FIGS. 4 and 5 and the new configuration of the new top surfaces 18' and 28 are to be noted.

In FIG. 4, a relatively very low blow ratio of only about 1½:1 has been used to illustrate the formation of vertical walls 20. It is to be noted in FIG. 4 that, although the walls 20 extend and stretch upwardly, they do not satisfactorily move the entire top surface layer 18' upwardly to form any very large open space or continuous channel bounded by the vertical walls 20, the relatively horizontal surface of the resinous base layer 12, and the lowermost portion of the top surface layer 18' which basically still clings for the most part to the upper surface of the resinous base layer 12. Thus, the total open space or continuous channel which is formed is often minimal or is even sometimes unsatisfactory for the intended purposes of the finished product as a solar heat energy collecting system.

Reference to FIG. 2 of the drawings which illustrates a very low blow ratio reveals that the ends I and O of the circuitous or serpentine path defined by the printing composition 14 extend to and are open to the atmosphere but possibly or apparently do not permit sufficient air to enter above such a path and hence the top surface layer 18' remains in contact for the majority of its total length with the surface of the resinous base layer 12, whereby there may be insufficient open space or continuous channel formed.

This difficulty is taken care of or is improved in several different ways. After the blown or foamed resinous base layer 12 is removed from the heated fusion oven atmosphere, an inlet conduit or feed pipe 24 and an outlet conduit or nozzle 26, both of which may be metallic or plastic, are inserted into the inlet and outlet ends I and O, respectively, (see FIG. 4A) and a fluid, either air, water, or the like, is pumped under relatively low pressure into and through the space bounded by the vertical walls 20 and the upper surface of the resinous base layer 12, whereby the major portion of the top surface layer 18' is released from its adherence to the resinous base layer 12 and moves upwardly to generally assume the configuration 18" shown in the FIG. 4A, or 28 in FIG. 5, and and a relatively large cross-sectional area open space or continuous channel 22 or 32 is thus formed in the solar heat energy collecting system.

An alternative method of increasing the cross-sectional areas is to include in the printing composition 14 a small amount of a blowing or foaming agent which is not affected by the inhibitor being utilized. Typical of such blowing agents are azoisobutyrodinitrile and dimethyldinitroso terephalamide, or the equivalents. Such blowing agents would tend to release sufficient gaseous materials during the blowing and foaming operation to permit the top surface layer 18 to move upwardly during the blowing and foaming operation to obtain the configuration 18" and 28 immediately. In this embodiment particular blowing or foaming agent selected to be included in the printing composition 14 is not affected by the particular blowing or foaming inhibitor which is included in the printing composition 14.

The amount or the concentration of the 'non-affected' blowing or foaming agent which is included in the formulation of the printing composition 14 will vary within relatively wide limits and will determine if the portions of the top surface layer 18" or 28 are to be distended upwardly to ultimately be arched or convex, or sunken or concave, or horizontal or level, depending upon the amount of gases liberated. Such varied configurations are illustrated in FIGS. 4A, 4, and 5, respectively.

As a result of the blowing and foaming operation, the resinous base layer 12 of the solar heat energy collecting system provides a relatively firm, dense base having a relatively higher specific gravity and a lower specific volume which is supported by a heat-insulating felted or matted fibrous sheet of overlapping and intermingled fibers and/or filaments 10. Portions of the resinous base layer 12, however, are noted as having foamed portions and relatively unfoamed portions which provides a very unique construction. The top surface layer 18" or 28 is of a relatively uniform density and is rather firm. On the other hand, the vertically extending walls 20 or 30 are substantially completely foamed and have a relatively low density or specific gravity and a relatively high specific volume and thus provide a heat-insulating barrier between the adjacent interconnecting open spaces or channels 22 and 32 which conduct the heat transfer fluid medium through the solar heat energy collecting system.

The extent to which the walls 20 and 30 stretch upwardly will depend upon the blow ratio created by the decomposition or the activation of the blowing or foaming agent in the potentially foamable, resinous base layer 12. The greater the blowing or foaming action, the higher the walls 20 and 30 extend. Blow ratios of from about 2:1 to about 6:1 are useful within the scope of the present invention. Lesser or greater blow ratios are useful for special circumstances.

An inlet conduit or feed pipe 34 and an outlet conduit or nozzle 36 may be fitted within the openings I and O of the outermost walls 20, 20 on each side of the solar heat energy collecting system, whereby a heat transfer fluid medium may be conducted into the interior of the system and subsequently removed therefrom at a relatively higher temperature due to the absorption of heat from the solar source. Consideration of Figures reveals the circuitous or serpentine path taken by such a heat transfer fluid medium.

The heat transfer fluid medium at the higher temperature may be used to heat any desired material, substance or system. One very notable use is the heating of the water to be used in a domestic or public swimming pool. The heated water is carried to the swimming pool through any desired pipe or conduit and the cooled water is returned through other conduits or pipes to the solar heat energy collecting system to be re-heated therein from the solar energy source. A conventional pumping system is used to insure that the flow is kept at constant and steady rates and the water kept at proper levels in the swimming pools.

The flexible and light weight nature of the solar heat energy collecting system of the present invention is such that it is easily moved and positioned on a roof of a house or barn or any other structure, preferably facing to the south so as to receive the full benefit of the sun's rays. Flexible conduits are very easily attached thereto, as desired, to supply the solar heat energy to any desired location. The edge point connections of the inlet and outlet conduits 24 and 26 are preferably placed at the highest and the lowest points, respectively, of the solar heat energy collecting system, so that the heat transfer fluid medium tends to naturally run downwardly therein, being aided to some degree by the force of gravity. Such, of course, is not too essential when the solar heat energy collecting system is positioned horizontally or level.

In the drawings, the vertical walls 20 and 30 have been illustrated as relatively slender and the plurality of channels 22 and 32 have consequently been of relatively large cross section whereby the volume of flow of heat transfer medium is relatively very large and the general effectiveness is excellent. This is ideal for those situations wherein the solar heat energy collecting system is placed in one location and is rarely, if ever, moved. In the event that increased portability is desired or required, such as in situations where frequent moving or rough handling or usage is anticipated, then the walls 20 and 30 may be thickened and thus strengthened by decreasing the areas of the printed, and gelled potentially foamable, resinous base layer 12 in which the blowing or foaming inhibitor is included. As a result, the channels 22 and 32 will ultimately have smaller cross-sectional areas. Such reduces the flow of heat transfer medium but increases the overall strength of the solar heat energy collecting system and enhances its resistence to collapse upon the application of any excessive external force or pressure. The integral seamless construction of the resinous base layer 12 and the vertical walls 22 and 32 adds to the basic strength of the solar heat energy collecting system.

THE EMBODIMENT OF FIG. 6

In FIG. 6, there is illustrated a modification of the various embodiments of FIGS. 1-5. In this embodiment, a relatively small but insufficient quantity of a non-affected blowing or foaming agent has been included in the printing composition 14. As a result, the top surface layer 48 is not elevated or raised sufficiently to the full height of the vertical walls 20 but actually droop or sag somewhat like hanging catenaries. An extra or second synthetic polymeric top surface layer 58, of a fluorocarbon, such as chlorotrifluoroethylene, polytetrafluoroethylene, fluorinated ethylene-propylene copolymers or similar fluoroplastics, ethylene-propylene copolymers, chlorsulphonated polyethylene polymers, acrylics, etc., or generally similar or equivalent materials, especially those having good UV and light and heat resistance, may be placed over and adhered to the top surface layer 48 at the highest portions thereof. In this way, there is formed a plurality of heat insulating, dead-air spaces or pockets 56. Such improves the efficiency or effectiveness of the solar heat energy collecting system. Such an extra or second top surface layer 58 may be relatively thin, on the order of from about 1 mil to about 5 mils and preferably from about 2 mils to about 4 mils, and is naturally weather resistant, solar resistant, UV resistant, etc., thus prolonging the useful and effective life of the solar heat energy collecting system. If desired, the top surfaces 28 and 48 may be strengthened by the lamination thereto or the inclusion thereinto of a reinforcing layer of fiberglass or like materials.

The extent of the droop or sag of the synthetic polymeric top surface layer 48 is determined by the quantity of the non-affected blowing or foaming agent which is included in those specific portions lying over the printing compositions which contain the blowing or foaming inhibitor and the release agent.

The top surface layer of the solar heat energy collecting system whether it be top surface 18 or 18", or 28 or 58, may be clear and colorless, transparent or translucent, or it may be colored or pigmented, black or any other color, as desired or required.

THE EMBODIMENT OF FIG. 7

In FIG. 7, there is illustrated a solar heat energy collecting system wherein an intake manifold 40 supplies heat transfer medium to a plurality of circuitous or sepentine paths within the solar heat energy collecting system and wherein an outlet manifold 42 removes the heated heat transfer fluid medium to be conducted to the material, substance or system to be heated.

If the flow of heated heat transfer medium is greater than that immediately required for instant or present use, then an insulated storage tank is provided for the heated heat transfer medium for subsequent or later use, whereby the benefits of the system can be extended beyond the time the solar heat energy source is available.

The invention has been described thus far with specific reference to the use of water as the heat transfer fluid medium, inasmuch as one of the most likely uses of the solar heat energy collecting system is in connection with the heating of water in domestic home or public building heating or in the heating of water for domestic or public swimming pools. The invention is not to be considered as limited to the use of water as the heat transfer medium, nor to the uses mentioned herein. Other suitable heat transfer fluid media include air for use in preheating air for use in equipment, motors, engines, or processes, or liquid black body media, such as aqueous dispersions of carbon black (30-40% carbon black and 60-70% water) or dispersions of carbon black in alcohol, brine, calcium chloride or other salt solutions, ethylene glycol, etc.

The present invention will be further described and illustrated with particular reference to the following specific working examples wherein there are disclosed preferred and typical compositions, materials, constructions, and embodiments of the inventive concept. However, it is to be stated that such specific examples are primarily merely illustrative of the present invention and are not to be considered limitative of the broader aspects thereof, except as defined and limited by the scope and the spirit of the appended claims.

EXAMPLE I

A solar heat energy collecting system, such as illustrated in FIGS. 1-5 of the drawings, is made as follows: The supporting substrate is an 0.030 inch thick fibrous felt sheet of overlapping, intermingled asbestos fibers. The potentially foamable resinous base layer which is formed on the surface of the supporting substrate has the following composition by weight:

| | Parts |
|---|---|
| Polyvinyl chloride, dispersion grade, sp. vis. 0.6 | 50 |
| Polyvinyl chloride, dispersion grade, sp. vis. 0.4 | 50 |
| Butyl benzyl phthalate primary plasticizer | 52 |
| Alkyl aryl hydrocarbon secondary plasticizer | 18 |
| Azodicarbonamide blowing and foaming agent | 3 |
| Dibasic lead phosphite stabilizer/accelerator | 2 |
| Pigment | 5 |

The potentially foamable, resinous base layer, as applied to the supporting substrate, and still wet, is a plastisol and has a thickness of about 0.032 inch. Gelling and firming takes place in a heated oven at a temperature of about 300° F. with an exposure time of about 3 minutes.

The printing compositions which are applied to the gelled and firmed plastisol are applied in the desired pattern and have the following compositions by weight:

|  | Parts |
|---|---|
| Vinyl chloride-vinyl acetate copolymer | 8.5 |
| Methyl ethyl ketone organic solvent | 51.5 |
| Inorganic pigment | 25.0 |
| Trimellitic anhydride blowing inhibitor | 15.0 |
| Tetrafluoroethylene polymer release agent | 2.5 |
| Vinyl chloride-vinyl acetate copolymer | 13.5 |
| Methyl ethyl ketone organic solvent | 61.5 |
| Pigment | 25.0 |
| No blowing or foaming inhibitor | |
| No release agent | |

After the printing compositions have dried, a relatively thin top surface layer is formed to a thickness of about 0.020 inch on the gelled and firmed, printed plastisol layer. The top surface layer has the following composition by weight:

|  | Parts |
|---|---|
| Polyvinyl chloride, dispersion grade, sp. vis. 0.5 | 95 |
| Polyvinyl chloride, suspension grade, sp. vis. 0.35 | 5 |
| Alkyl aryl modified phthalate ester plasticizer | 38 |
| Epoxidized tall oil ester secondary plasticizer | 5 |
| 2,2,4-trimethyl-1,3-pentanediol diisobutyrate | 7 |
| Heat stabilizer | 3 |
| UV stabilizer | 0.5 |
| Viscosity control agent | 1.2 |
| Pigment | 3 |

The top surface layer is gelled and firmed in an oven maintained at a temperature of about 300° F. The exposure time is about 3 minutes.

Blowing and foaming take place at a temperature of about 385° F. for a period of about 2 minutes and 45 seconds. Those portions of the resinous base layer which are not located under the trimellitic anhydride increase in height from about 0.032 inch to about 0.096 inch, thus indicating a blow ratio of about 3:1. Vertical walls are formed and the top surface layer is carried upwardly during the blowing and foaming, whereby a plurality of interconnected open channels are formed. Those portions of the resinous base layer which are located under the trimellitic anhydride blowing inhibitor are relatively unaffected as to their heights during the blowing and foaming operation.

The cross-sectional areas of the interconnected open channels are increased by passing warm air therethrough promptly after delivery from the heated fusion oven.

Inlet and outlet conduits are then attached to the openings at the edge points and water at room temperature is passed through the solar heat energy collecting system which is exposed to a bright sunshine. The water issuing from the outlet conduit is considerably warmer than the water entering at the inlet conduit.

EXAMPLE II

The procedures described in Example I are followed substantially as set forth therein with the exception that the polyvinyl chloride top surface layer is replaced by a polyurethane resin top coating layer. The polyurethane resin is formulated as follows: an aliphatic diisocyanate (hexamethylene cyclohexyl diisocyanate) is the NCO source; the reacting polyols groups are supplied by a mixture of polyesters and polyethers, with the polyesters being in the majority and the polyethers being in the minority; and the catalyst is a mixture of tetrakis-hydroxypropyl ethylene diamine, a tertiary amine, and dibutyl tin dilaurate. The polyurethane is applied to the gelled and firmed, printed potentially foamable, resinous base layer to a substantially uniform thickness of about 0.012 inch.

The results of this Example are generally comparable to the results of Example I. The solar heat energy collecting system is operative and is commercially acceptable.

EXAMPLE III

The procedures described in Example I are followed substantially as set forth therein with the exception that the printing compositions are different. In this Example, the first printing composition is simply trimellitic anhydride blowing and foaming inhibitor and polytetrafluoroethylene polymer release agent.

The results of this Example are generally comparable to the results obtained in Example I. The solar heat energy collecting system is operative and is commercially acceptable.

EXAMPLE IV

The procedures described in Example I are followed substantially as set forth therein with the exception that the second printing composition is omitted completely. The results of this Example are generally comparable to the results obtained in Example I. The solar heat energy collecting system is operative and is commercially acceptable.

EXAMPLE V

The procedures described in Example III are followed substantially as set forth therein with the exception that the trimellitic anhydride blowing and foaming agent and the polytetrafluoroethylene polymer release agent are applied in two separate coating operations and the second printing composition is omitted entirely. The results of this Example are generally comparable to the results obtained in Example III. The solar heat energy collecting system is commercially acceptable.

EXAMPLE VI

The procedures described in Example I are followed substantially as set forth therein with the addition that a second supporting substrate is applied to the bottom surface of the fibrous sheet of overlapping, intermingled asbestos fibers. The second supporting substrate is a quarter-inch sheet of light-weight, multi-cellular, foamed polyurethane polymer. The results of this Example show improved insulating properties over the product of Example I.

Although several specific working examples of the inventive concept have been described in particularity, the same should not be construed as limiting the invention in the specific materials and procedures mentioned therein but to include other materials and other procedures, as well as other equivalent features, as set forth in the appended claims. It is to be understood that any suitable changes, modifications, and variations may be made without departing from the scope and spirit of the broader aspect of the inventive concept.

What is claimed is:

1. A method of making a solar heat energy collecting system which comprises: forming a potentially foamable, resinous base layer containing a blowing agent; applying a printing composition to the surface of said potentially foamable, resinous base layer in the form of at least one continuous path extending from one edge point to another edge point of said potentially foamable, resinous base layer, said printing composition comprising a blowing inhibitor and a release agent; applying a top surface layer to the surface of said printed potentially foamable, resinous base layer which adheres thereto except in those areas containing said blowing inhibitor and said release agent; and heating said potentially foamable, resinous base layer to decompose or to activate said blowing agent in those portions of said potentially foamable, resinous base layer not lying under said blowing inhibitor and said release agent, whereby said portions are blown and expand to extend and stretch upwardly so as to form upright walls of foamed, relatively lower density resinous material extending away from the main level portion of said resinous base layer and capable of supporting said top surface layer at varying distances from the surface of said main level part of said resinous base layer, while those other portions of said potentially foamable, resinous base layer lying under said blowing and said release agent remain relatively unaffected and do not expand to extend or stretch upwardly, said upright walls, said top surface layer, and said relatively unaffected portions of the main level part of said resinous base layer forming at least one continuous open channel extending from one edge point to another edge point of said resinous base layer.

2. A method of making a solar heat energy collecting system as defined in claim 1 wherein a fluid medium is supplied to said continuous open channel after said heating step to raise said top surface layer and to increase the distance thereof from said relatively unaffected portions of the main level part of said resinous base layer, thus increasing the cross-section of said continuous open channel.

3. A method of making a solar heat energy collecting system as defined in claim 1 wherein inlet and outlet conduits are provided at said edge points and a heat transfer medium is delivered to one edge point of said continuous open channel, is passes therethrough, to exit from said other edge point, absorbing solar energy as it passes therethrough.

4. A method of making a solar heat energy collecting system as defined in claim 1 wherein said potentially foamable, resinous base layer is formed upon a supporting substrate.

5. A method of making a solar heat energy collecting system as defined in claim 1 wherein a non-affected blowing agent is included in said printing composition to assist in the raising of said top surface layer from said relatively unaffected portions of the main level part of said resinous base layer.

6. A method of making a solar heat energy collecting system as defined in claim 1 wherein said printing composition is so applied to the surface of said potentially foamable, resinous base layer as to create a plurality of continuous open channels therein.

7. A method of making a solar heat energy collecting system as defined in claim 1 wherein a second top surface layer is applied to the top surface of said top surface layer.

8. A method of making a solar heat energy collecting system as defined in claim 4 wherein a second supporting substrate is applied to the bottom surface of said supporting substrate.

* * * * *